US011856938B1

(12) United States Patent
Bart et al.

(10) Patent No.: US 11,856,938 B1
(45) Date of Patent: Jan. 2, 2024

(54) ROBOTIC ROVER

(71) Applicant: Alarm.com Incorporated, Tysons, VA (US)

(72) Inventors: Gary Franklin Bart, Weston, FL (US); Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 1649 days.

(21) Appl. No.: 15/943,286

(22) Filed: Apr. 2, 2018

Related U.S. Application Data

(60) Provisional application No. 62/479,366, filed on Mar. 31, 2017.

(51) Int. Cl.
*A01M 29/00* (2011.01)
*A01M 7/00* (2006.01)
(Continued)

(52) U.S. Cl.
CPC .......... *A01M 29/00* (2013.01); *A01M 7/0042* (2013.01); *A01M 7/0085* (2013.01);
(Continued)

(58) Field of Classification Search
CPC .. A01M 29/00; A01M 7/0042; A01M 7/0085; A01M 7/0089; G05D 1/0088;
(Continued)

(56) References Cited

U.S. PATENT DOCUMENTS

| 5,216,832 A | 6/1993 | Darby |
|---|---|---|
| 6,134,184 A | 10/2000 | Waletzky et al. |

(Continued)

FOREIGN PATENT DOCUMENTS

| CA | 2979408 | 9/2016 |
|---|---|---|
| CA | 3000035 | 4/2017 |

(Continued)

OTHER PUBLICATIONS

Canadian Office Action in Canadian Application No. 3,049,726, dated Jul. 30, 2020, 6 pages.
(Continued)

*Primary Examiner* — Muhammad Shafi
(74) *Attorney, Agent, or Firm* — Fish & Richardson P.C.

(57) ABSTRACT

A robotic rover that is configured to monitor a property is disclosed. In one aspect, the rover includes a sensor that is configured to generate sensor data. The rover further includes a processor that is configured to analyze the sensor data. The processor is further configured to determine that an unwanted animal is located at the property. The processor is further configured to generate an instruction to navigate the drone towards the unwanted animal. The rover further includes a motor that is configured to navigate the drone towards the unwanted animal in response to the instruction to navigate the drone towards the unwanted animal. The processor is further configured to generate an instruction to activate a device that is configured to encourage the unwanted animal to leave the property.

21 Claims, 5 Drawing Sheets

(51) Int. Cl.
*G05D 1/00* (2006.01)
*G06V 20/52* (2022.01)

(52) U.S. Cl.
CPC ......... *A01M 7/0089* (2013.01); *G05D 1/0088* (2013.01); *G05D 1/0094* (2013.01); *G06V 20/52* (2022.01); *G05D 2201/0207* (2013.01)

(58) Field of Classification Search
CPC ......... G05D 1/0094; G05D 2201/0207; G06V 20/52
USPC .......................................................... 116/22
See application file for complete search history.

(56) References Cited

U.S. PATENT DOCUMENTS

| | | | |
|---|---|---|---|
| 6,412,210 | B1 | 7/2002 | Horrell |
| 8,948,935 | B1 | 2/2015 | Peeters et al. |
| 9,373,014 | B1 | 6/2016 | Mehranfar |
| 9,464,907 | B1 | 10/2016 | Hoareau et al. |
| 9,589,448 | B1 | 3/2017 | Schneider et al. |
| 9,836,885 | B1 | 12/2017 | Eraker et al. |
| 10,042,086 | B1 | 8/2018 | Smalley |
| 10,655,968 | B2 | 5/2020 | Rezvani |
| 11,060,873 | B2 | 7/2021 | Rezvani |
| 2004/0073368 | A1 | 4/2004 | Gonzalez-Banos et al. |
| 2004/0253908 | A1 | 12/2004 | Thiry |
| 2006/0278170 | A1* | 12/2006 | DeMoor ............ A01M 31/002 119/161 |
| 2007/0125306 | A1 | 6/2007 | Beecher |
| 2007/0221115 | A1 | 9/2007 | Pollard et al. |
| 2008/0017132 | A1 | 1/2008 | Merrifield et al. |
| 2008/0198009 | A1* | 8/2008 | Hoeben ............... G08B 15/00 340/541 |
| 2008/0314334 | A1* | 12/2008 | Dalton ................. A01M 29/10 119/719 |
| 2009/0272326 | A1 | 11/2009 | Bacon |
| 2011/0112660 | A1 | 5/2011 | Bergmann et al. |
| 2014/0118140 | A1 | 5/2014 | Amis |
| 2014/0172727 | A1 | 6/2014 | Abhyanker et al. |
| 2015/0109338 | A1 | 4/2015 | McKinnon et al. |
| 2015/0127486 | A1 | 5/2015 | Advani |
| 2015/0339912 | A1 | 11/2015 | Farrand et al. |
| 2016/0047663 | A1 | 2/2016 | Iyer et al. |
| 2016/0063642 | A1 | 3/2016 | Luciani et al. |
| 2016/0088286 | A1 | 3/2016 | Forsythe et al. |
| 2017/0011477 | A1 | 1/2017 | Murphey |
| 2017/0073085 | A1 | 3/2017 | Tremblay et al. |
| 2017/0251633 | A1 | 9/2017 | Womble et al. |
| 2017/0341746 | A1 | 11/2017 | Erickson et al. |
| 2018/0000575 | A1* | 1/2018 | Fobi ..................... B64C 39/024 |
| 2018/0005143 | A1 | 1/2018 | Camargo et al. |
| 2018/0027772 | A1* | 2/2018 | Gordon ................. G05D 1/104 |
| 2018/0137728 | A1 | 5/2018 | Hahn |
| 2018/0178781 | A1 | 6/2018 | Funk et al. |
| 2019/0012887 | A1 | 1/2019 | Troesch et al. |
| 2019/0217131 | A1 | 7/2019 | Zechlin |
| 2020/0278209 | A1 | 9/2020 | Rezvani |
| 2021/0333109 | A1 | 10/2021 | Rezvani |

FOREIGN PATENT DOCUMENTS

| | | |
|---|---|---|
| KR | 101653125 | 9/2016 |
| WO | WO2016/180796 A2 | 11/2016 |
| WO | WO2016/180796 A3 | 11/2016 |

OTHER PUBLICATIONS

European Office Action in European Application No. 18738855.8, dated Oct. 28, 2020, 7 pages.

Extended European Search Report in European Application No. 18738855.8, dated Dec. 16, 2019, 10 pages.

International Search Report and Written Opinion in International Application No. PCT/US18/13146, dated Mar. 28, 2018, 16 pages.

Measure-Red Cross, "Drones for Disaster Response and Relief Operations," IssueLab, Apr. 1, 2015, 52 pages, XP055646197.

Mutlu et al., "Indoor Navigation and Guidance of an Autonomous Robot Vehicle with Static Obstacle Avoidance and Optimal Path Finding Algorithm", IFAC the 2012 IFAC Workshop on Automatic Control in Offshore Oil and Gas Production, vol. 45, No. 24, Sep. 12-14, 2012, pp. 315-319, XP055743128, Red Hook, NY.

PCT International Preliminary Report on Patentability in International Application No. PCT/US2018/013146, dated Jul. 25, 2019, 6 pages.

Robinette et al., "Overtrust of Robots in Emergency Evacuation Scenarios," Human Robot Interation, IEEE Press, Mar. 7, 2016, pp. 101-108, XP058081766.

Toon, John, "In Emergencies, Should You Trust a Robot?", Georgia Tech, Feb. 29, 2016, 6 pages, XP055646153.

AU Examination Report in Australian Appln. No. 2021204810, dated Oct. 5, 2022, 5 pages.

AU Examination Report in Australian Appln. No. 2021204810, dated Oct. 6, 2022, 6 pages.

"At CES, flying drones are Alarm.com's home security moonshot" Ry Crist, Jan. 3, 2017, cnet.com retrieved from https://www.cnet.conn/news/at-ces-flying-drones-are-alarm-conn-home-security-moonshot-ces-2017/ (Year: 2017).

* cited by examiner

ROBOTIC ROVER

BRIEF DESCRIPTION OF THE DRAWINGS

This application claims the benefit of U.S. Provisional Application No. 62/479,366, filed Mar. 31, 2017, which is incorporated by reference.

TECHNICAL FIELD

Figure 1:
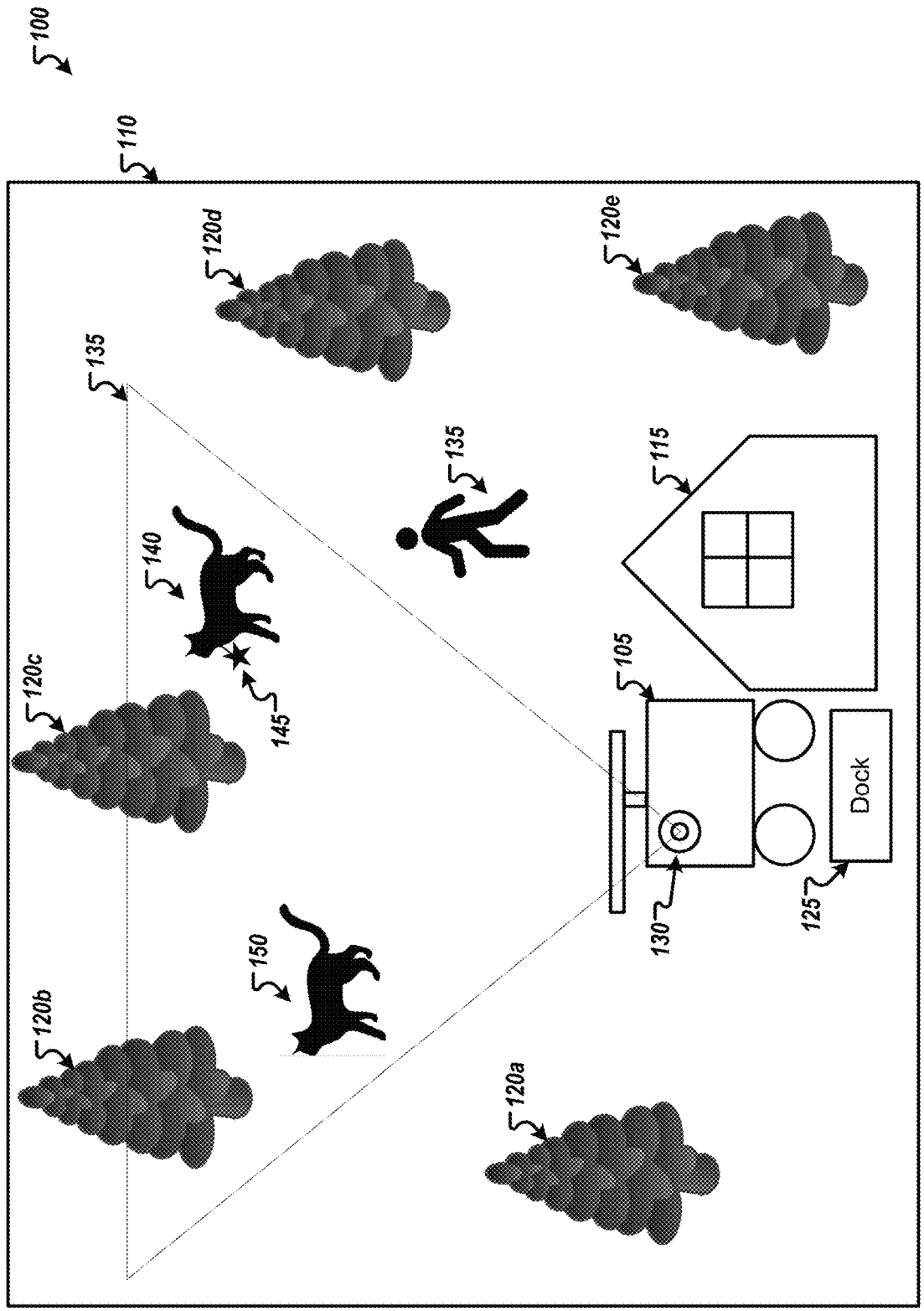

This disclosure relates to autonomous drones.

BACKGROUND

A drone device, refers to an electronic device that is capable of navigating, either under remote control by a human operator, or fully or intermittently autonomously, by onboard or remote computers. Drone devices can be associated with a monitoring system of a property to perform various types of monitoring operations of the property. For example, a camera of a drone device can capture video footage of a property while performing a surveillance operation.

SUMMARY

In many areas, homeowners are impacted by the effects of unwanted animals encroaching on the homeowner's property. The unwanted animals may cause destruction to vegetation, leave bodily waste behind, and be a general nuisance. To ward off unwanted animals a homeowner may install motion sensing sprinkler heads, use chemicals, or install ultrasonic devices. Some of these devices and techniques may be limited by weather conditions or may be potentially harmful to people or the environment.

Most unwanted animals would leave the area if they were confronted by an object and sensory input that is unfamiliar to them. This disclosure describes a robotic rover that may be an autonomous and mobile device that is configured to locate unwanted animals and move around a property to the area where the unwanted animal is located. The rover may cause the animal to flee or leave the property by using any combination of water, light, or sound. The rover may cause the animal to flee or leave by physically contacting or moving near the unwanted animal. The rover is also configured to distinguish unwanted animals from humans and pets.

An innovative aspect of the subject matter described in this specification may be implemented in a robotic rover or drone that includes a sensor that is configured to generate sensor data; a processor that is configured to analyze the sensor data; based on analyzing the sensor data, determine that an unwanted animal is located at the property; based on determining that an unwanted animal is located at the property, generate an instruction to navigate the drone towards the unwanted animal; and a motor that is configured to navigate the drone towards the unwanted animal in response to the instruction to navigate the drone towards the unwanted animal. The processor is configured to generate an instruction to activate a device that is configured to encourage the unwanted animal to leave the property. The drone includes a device that is configured to activate in response to the instruction to activate the device to encourage the unwanted animal to leave the property.

These and other implementations can each optionally include one or more of the following features. The sensor includes a camera. The sensor data includes image data. The processor is configured to analyze the sensor data by analyzing the image data; determine that an unwanted animal is located at the property by, based on analyzing the image data, identifying an object that is moving and determining that a shape of the object is non-human shaped; based on determining that the object is moving and determining that the shape of the object is non-human shaped, determining that the object is an unwanted animal. The drone includes a receiver that is configured to receive a signal. The processor is configured to analyze the signal; based on analyzing the signal, determine that a transmitter of the signal corresponds to a known transmitter; and based on analyzing the sensor data and determining that the transmitter of the signal corresponds to a known transmitter, determine that a known animal is located at the property. The transmitter is included in a pet collar and the known animal is a pet. The drone includes a water tank that is configured to store water.

The device that is configured to activate in response to the instruction to activate the device to encourage the unwanted animal to leave the property includes a water nozzle that is configured to spray water from the water tank. The processor configured to generate an instruction to activate the device that is configured to encourage the unwanted animal to leave the property by generating an instruction to spray water from the water nozzle towards the unwanted animal. The device that is configured to activate in response to the instruction to activate the device to encourage the unwanted animal to leave the property includes a speaker. The processor is configured to generate an instruction to activate the device that is configured to encourage the unwanted animal to leave the property by generating an instruction to provide audio data to the speaker. The processor is configured to generate an instruction to activate the device that is configured to encourage the unwanted animal to leave the property by generating an instruction for the drone to physically contact the unwanted animal. The sensor includes a microphone. The sensor data includes audio data. The processor is configured to analyze the sensor data by comparing the audio data to stored audio data that includes sounds of various unwanted animals; determine that an unwanted animal is located at the property by, based on comparing the audio data to the stored audio data that includes sounds of various unwanted animals, determining that the audio data corresponds to an unwanted animal.

The processor is configured to, based on analyzing the sensor data, determine that the unwanted animal is outside of the property; and, based on determining that the unwanted animal is outside of the property, generate an instruction to navigate the drone to a dock. The processor is configured to, based on analyzing the sensor data, determine a location of an object located at the property; compare the location of the object to locations of known objects that are at the property and that are not unwanted animals; based on comparing the location of the object to the locations of known objects that are at the property and that are not unwanted animals, determine that the location of the object does not correspond to one of the locations of known objects that are at the property and that are not unwanted animals; and determine that an unwanted animal is located at the property based on determining that the location of the object does not correspond to one of the locations of known objects that are at the property and that are not unwanted animals.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A drone may automatically keep a property free of unwanted animals which can improve the safety of a homeowner and the homeowner's pets.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIG. 1 illustrates an example system that includes a robotic rover scanning the premises of a property for unwanted animals.

Figure 2:
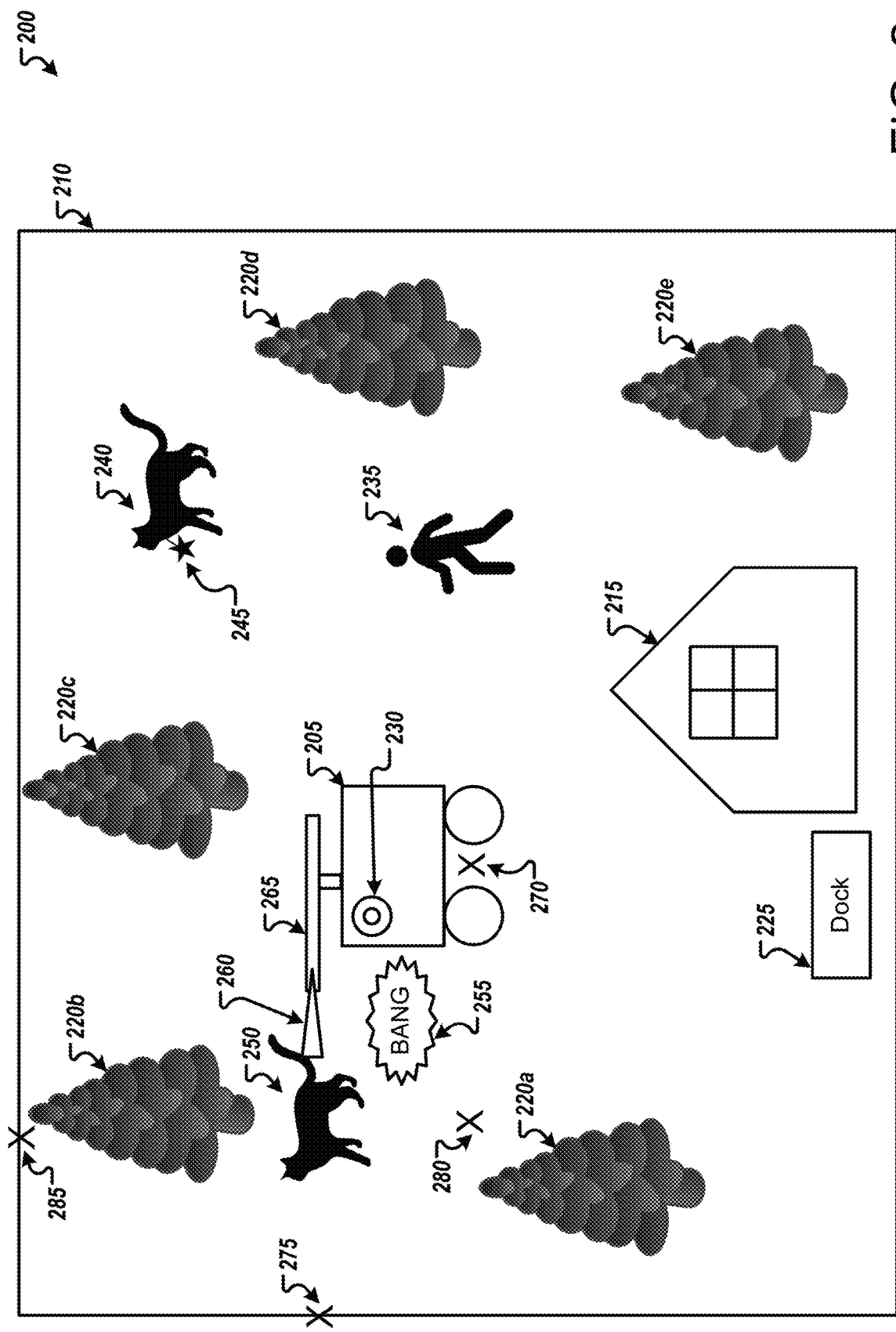

FIG. 2 illustrates an example system that includes a robotic rover scaring off an unwanted animal from the premises of a property.

Figure 3:
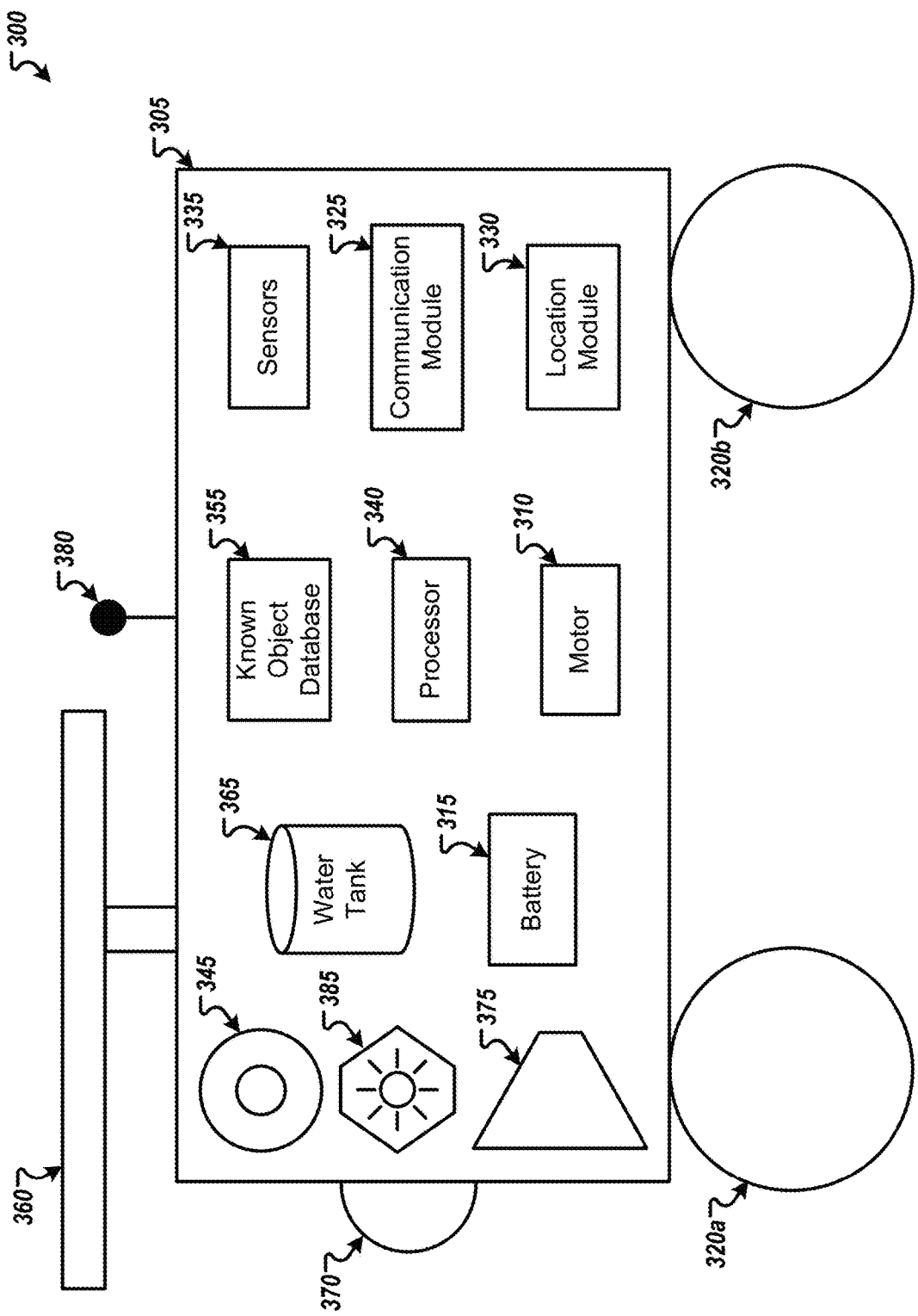

FIG. 3 illustrates an example robotic rover.

Figure 4:
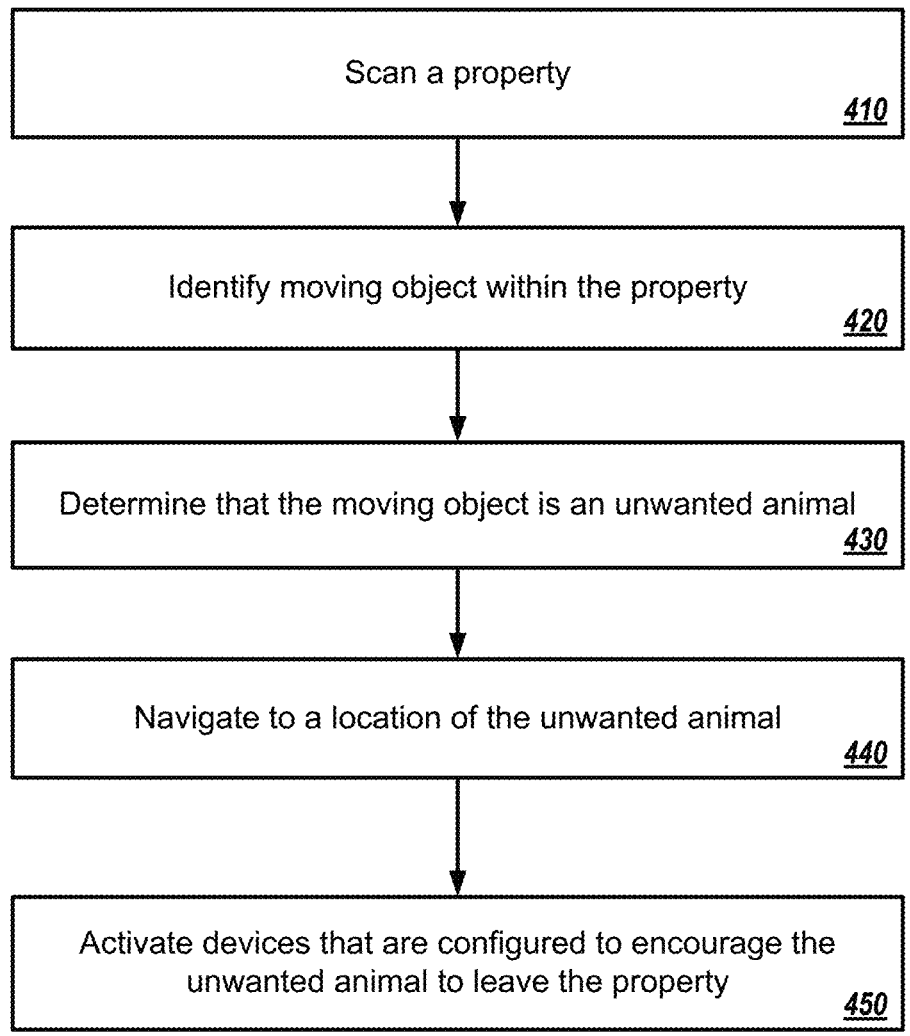

FIG. 4 illustrates an example process for identifying and removing an unwanted animal from a property.

Figure 5:
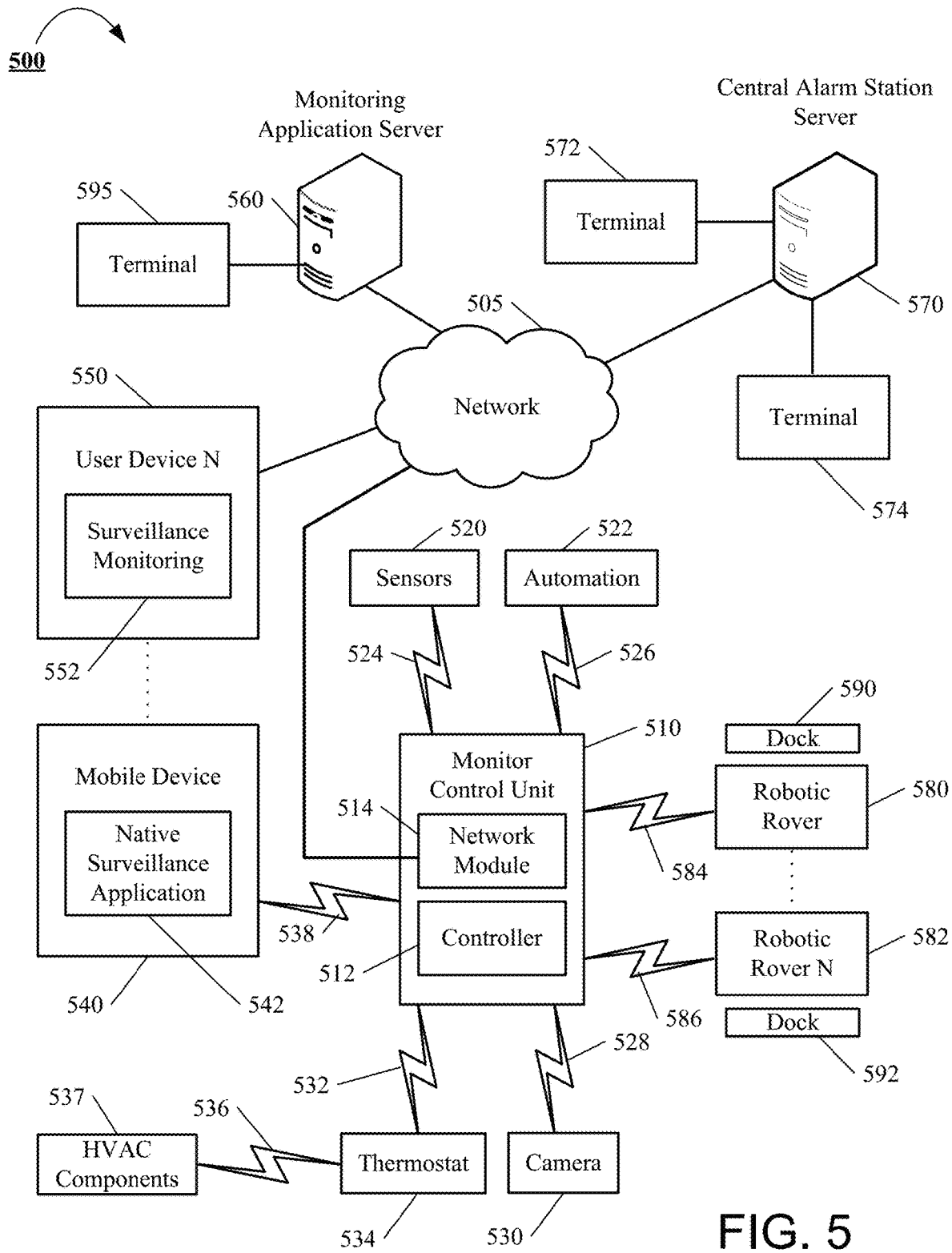

FIG. 5 is a block diagram of components of a system for identifying and removing an unwanted animal from a property.

In the drawings, like reference numbers represent corresponding parts throughout.

DETAILED DESCRIPTION

FIG. 1 illustrates an example system 100 that includes a robotic rover 105 scanning the premises of a property 110 for unwanted animals. Briefly, and as described in more detail below, the robotic rover 105 is located within the premises of the property 110 and identifies moving objects within the property 110. The robotic rover 105 determines whether a moving object is an unwanted animal.

In more detail and as illustrated in FIG. 1, the property 110 includes a house 115 that is located within a property line of the property 110. A fence, wall, driveway, or other manmade barrier may be located at or near the property line. The property line may also include vegetation. For example, the property line may be a hedge, unkempt bushes, trees, grass, or any other natural vegetation. In some implementations, any barrier on the property line may be inadequate to deter unwanted animals from entering the property 110. For example, deer may jump over many fences, and grass will do little to prevent animals from entering the property 110. The property 110 may include trees 120a-120e. The trees may provide alternative paths for climbing animals to enter the property 110. For example, a squirrel may jump from a tree outside the property 110 to tree 120d, climb down the tree 120d, and roam around the property 110.

To identify and chase off unwanted animals, the property owner may place a robotic rover 105 within the property 110. The robotic rover 105 may be configured to scan the premises of the property 110 and identify unwanted animals. The robotic rover 105 is configured to traverse terrain that may be typical of a residential yard. For example, the rover 105 may include a suspension, wheels, and motor that are adequate for traversing grass, mulch, gravel, concrete, wood, or any other similar terrain. The rover 105 identifies an unwanted animal and then traverses to the location of the unwanted animal by powering the wheels with the motor.

The property owner may place the rover 105 and the dock 125 in an outdoor area of the property 110. The dock 125 may be a home base for the rover 105. The dock 125 may be plugged into an outlet of the house 115 and provide power to the rover 105 while the rover is docked. The dock 125 may also have a communication module that is configured to communicate with a monitoring system of the house 115 and with the rover 105. The communication module may communicate with the rover 105 to guide the rover 105 back to the dock 125. The dock 125 may be connected to a water source and supply water to the rover 105 to fill the rover's water tank. The dock 125 may include mechanical or magnetic connections to ensure the rover 105 is correctly positioned to charge and receive water from the dock 125.

While the rover 105 is docked, the rover 105 may scan the property 110 for an unwanted animal. The rover 125 may include an image sensor 130 that is configured to capture images of the property 110. The rover 105 may perform analytics on the captured images to identify the objects included in the images. Depending on the position of the dock, the rover 105 may have a full view of the property 110 or may be blocked by objects such as the house 115. For example, the image sensor 130 may have a field of view 135. The rover 105 may rotate the image sensor 130 and scan the property. The field of view 135 may be able to capture all areas of the property 110 except the area with tree 120e because that portion of the property 110 is blocked by the house 120e.

During scanning of the property 110, the trees 120a-120d may be within the field of view of the image sensor 130. The rover 105 may include processing capabilities that allow the rover 105 to analyze the images captured by the image sensor 130. In some implementations, the rover 105 may analyze the movement of the trees 120a-120d and determine that the trees do not move enough during a particular period of time to be an animal. In some implementations, the rover 105 may analyze the size of different objects captured by the image sensor 130. Objects that are below a threshold size or that are not shaped like a typical animal may be ignored by the rover 105. For example, the rover 105 may capture an image of the tree 120a and determine that it is not an animal based on the size and shape of the tree 120a.

During scanning of the property 110, the person 135 may be within the field of view of the image sensor 130. The rover 105 may determine that the object that corresponds to the person 135 is not an animal based on the size of the object. In addition to analyzing the shape of the object that corresponds to the person 135, the rover may use an infrared sensor. The rover 105 may analyze the infrared image to determine that the size and shape of the object that corresponds to the person 135 is not an animal.

During scanning of the property 110, the animal 140 may be within the field of view of the image sensor 130. The rover 105 may determine, based on the size and movement of an image object that corresponds the animal 140, that the animal 140 is potentially an unwanted animal. The rover 105 detects the tag 145 on the animal 145 and compares the tag 145 to a known tag database. The rover 105 identifies a match between the tag 145 and the known tag database and determines that the animal 145 is not an unwanted animal. The property owner 110 may place the tag 145 on a pet so that the rover 105 does not identify the animal 145 as an unwanted animal. The tag 145 may be configured to transmit a signal that identifies the tag 145 and that the rover 105 is configured to receive. For example, the tag 145 may be a low powered radio that transmits a beacon signal every minute.

During scanning of the property 110, the animal 150 may be within the field of view of the image sensor 130. The rover 105 may determine, based on the size and movement of an image object that corresponds the animal 150, that the animal 150 is potentially an unwanted animal. Because the rover 105 does not detect a known tag on the animal 150, the rover 105 may determine that the animal 150 as an unwanted animal and initiate the process to encourage the animal 150 to leave the property 110.

FIG. 2 illustrates an example system 200 that includes a robotic rover 205 scaring off an unwanted animal 250 from the premises of a property 210. Briefly, and as described in more detail below, the robotic rover 105 traverses the property 210 to the location of the unwanted animal 250 and uses various techniques to encourage the unwanted animal 250 to leave the property 210.

In more detail and as illustrated in FIG. 2, the rover 205 has left the dock 225 and traveled to the location of the unwanted animal 250. In some implementations, to travel to the location of the unwanted animal 250, the rover 205 may track the movement of the unwanted animal 250 using the image sensor 230. In some implementations, the rover 205 may store a map of the property 205 in memory of the rover 205. Based on the location of the unwanted animal 250 in the image and the position of the image sensor 230 while the rover 205 was docked, the rover may determine an approximate location of the unwanted animal 250. The rover may traverse the property 205 according to the map to reach the approximate location of the unwanted animal 250.

The rover 205 arrives at the approximate location of the unwanted animal 250. The rover 205 may scan the area using the image sensor 230 or with an infrared sensor to locate the unwanted animal 250 in case the unwanted animal 250 has moved. The rover 205 initiates techniques to encourage the unwanted animal 250 to move from the property 210 without injuring the unwanted animal 250. For example, the rover 205 may make noise 255 to scare the unwanted animal 250. The noise 255 may be audible to humans or may be ultrasonic noise.

The rover 205 may also spray the unwanted animal 250 with water 260. The water 260 may be stored in a water tank that is located in the rover 205. The rover 205 may include a nozzle 265 that is configured to spray water 260 in a particular direction. The nozzle 265 may be configured to rotate left and right and move up and down. In this instance, the rover 205 may remain stationary and spray water 260 at the unwanted animal 250 while the unwanted animal 250 runs around.

The rover 205 may also physically bump the unwanted animal 250 to encourage the unwanted animal 250 to leave the property. For example, the rover 205 may retract the nozzle 265 and nudge the unwanted animal 250 with the body of the rover 205. In instances where the rover 205 is moving closer to the unwanted animal 250, the rover 205 may reduce the power of the nozzle 265 and the noise 255 so as to not injure or damage the hearing of the unwanted animal 250. The rover 205 may also limit the number of nudges, sprays, sounds, or any other technique to prevent any possible injury to the unwanted animal 250.

In some implementations, the rover 205 may approach the unwanted animal 250 in a direction such that the rover 205 encourages the unwanted animal 250 to exit the property 210 by traversing the shortest route. For example, the rover 205 may approach the unwanted animal 250 at location 270 to encourage the animal to exit at location 275. If the rover 205 approached the unwanted animal 250 at location 280, then the unwanted animal 250 may exit the property 210 at location 285. In this instance, there may be a greater chance of the unwanted animal 250 running towards the middle of the property where the rover 205 may have to traverse a greater distance to encourage the unwanted animal 250 to leave the property 210. In some implementations, the rover 205 may approach the unwanted animal 250 such that the unwanted animal 250 is located between a corner of the property 210 and the rover 205, where the unwanted animal 250, the corner, and the rover 205 form approximately a straight line. In this instance, the unwanted animal 250 may be more likely to leave the property 210 instead of escape the rover 205 towards a more central portion of the property 210.

In some implementations, the rover 205 may approach the unwanted animal 250 to encourage the unwanted animal 250 to exit the property 205 in a direction that is away from any people or pets. For example, the rover 205 may place itself between the unwanted animal 250 and person 235 and animal 240. In this instance, the rover 205 activates the techniques to encourage the unwanted animal 250 to exit the property 210 in a direction away from the person 235 and animal 240.

FIG. 3 illustrates an example robotic rover 300. Briefly, and as described in more detail below, the robotic rover 300 may be similar to the rovers 105 and 205 described in relation to FIGS. 1 and 2, respectively. The rover 300 is configured to detect unwanted animals and encourage them to leave the property monitored by the rover 300. The rover 300 may include one or more of the following features in any combination.

The rover 300 includes a body 305. The body 305 may be made of any rigid material such as plastic or metal. The body 305 may include water proof areas that hold sensitive electronics as the rover 300 will be used almost exclusively outdoors. The body 305 may be configured to blend in with its surroundings, especially when docked. The body 305 may change shape or deploy an arm or other object so that it appears foreign to an unwanted animal.

The body 305 may include a motor 310 that is powered by a battery 315. The motor 310 may be configured to rotate the wheels 320a-320b. The wheels 320a-320b may be configured differently depending on the terrain of the monitored property. For example, the wheels 320a-320b may be four inches in diameter for terrain that is primarily grass. The wheels 320a-320b may be six inches in diameter for terrain that is primarily rocky. The rover 300 may be configured to charge the battery 315 when coupled to a docking station. The docking station may be plugged into a power outlet or another power source.

The rover 300 includes a communication module 325. The communication module 325 is configured to communicate with a monitoring system that monitors the property patrolled by the rover 300. The communication module 325 may also be configured to communicate with a cellular or Wi-Fi network. The communication module 325 may be configured to detect beacon signals from tags placed on pets. The communication module 325 may be configured to transmit a signal to scan for tags placed on pets. The communication module 325 may be configured to detect signals from beacons placed around the property for the purpose of assisting the rover in orientating itself within the property by measuring signal timing and delay. The communication module 325 may be configured to communicate with a docking station to assist the rover 300 in locating the docking station. The communication module 325 may receive information from cameras located around the monitored property. For example, a camera in the yard may provide video data to the communication module 325. The rover 300 may analyze the video data to determine whether there is an unwanted animal in the field of view of the yard camera. In some implementations, the yard camera may provide the video data to a monitoring system of the property that will analyze the video data for an unwanted animal. If the monitoring system determines that an unwanted animal is likely within the field of view of the camera, then the monitoring system may deploy the rover 300.

The rover 300 includes a location module 330. The location module 330 may include a GPS receiver or other location detecting devices. The rover 300 includes one or more sensors 335. The sensors 335 may include sonar sensors, LIDAR sensors, and/or other visual sensors that the rover 300 may use to detect object around the rover 300. The sensors 335 may include a temperature sensor, humidity sensor, and/or a barometric sensor.

The rover 300 includes a processor 340 that is configured to process the data from the location module 330, communication module 325, and sensors 335. The processor 340 may provide instructions to the motor 310 based in part on the data from the location module 330, communication module 325, sensors 335, image sensor 345, and/or microphone 350. Additionally, or alternatively, the processor 340 may provide instructions to the devices that are configured to encourage unwanted animals to leave the property based on the data from the location module 330, communication module 325, sensors 335, image sensor 345, and/or microphone 350.

The rover 300 includes a known object database 355. The known object database 355 may include information such as a map of the property including boundary points of the property, trees, obstacles (e.g., fountains, ponds, etc.), terrain changes, cameras, docking stations, etc. as well as GPS coordinates for each object in the property. The known object database 355 may also include data identifying tags on pets. The tags may be configured to transmit data identifying the particular tag, and the communication module receives the transmissions. The processor may compare the received tag information to those tags in the known object database 355 to assist in identifying unwanted animals.

The rover 300 includes a water nozzle 360 that draws water from the water tank 365. The rover may aim the water nozzle 360 at and spray water on an unwanted animal to encourage the animal to leave the property. The water nozzle 360 may be configured to spray water at different strengths depending on the size of the unwanted animal and the proximity of the unwanted animal to the rover 300. The water nozzle 360 may be configured to retract when not in use and rotate from left to right and up and down. The water tank 365 may include a sensor to detect the water level and a water heater to prevent the water from freezing. When the water tank 365 is below a certain threshold, the rover 300 may return to the docking station to refill the water tank 365. In some implementations, the rover 300 may continue to encourage an unwanted animal to leave the property while the water tank is low to ensure the unwanted animal has left the property instead of returning to the docking station.

The rover 300 includes an image sensor 345. The image sensor 345 is configured to capture images of the surrounding area. The image sensor 345 may capture still images or video and provide the data to the processor 340 for analysis in identifying unwanted animals using video analytics. The image sensor 345 may be configured to scan the property while the rover 300 remains stationary and may include zoom lenses. In some implementations, the image sensor 300 may not function in a low light or nighttime environment. In these instances, the rover 300 may include infrared sensors. The rover 300 may use the infrared sensors in low light settings and/or to identify heat patterns of warm blooded animals.

The rover 300 includes a bumper 370. The rover 300 may navigate close to an unwanted animal and nudge the unwanted animal with the bumper 370 in an attempt to encourage the unwanted animal to leave the property. The bumper 370 may be constructed of rubber or a similar material to prevent injury to the unwanted animal upon contact. The rover 300 may be configured to contact the unwanted animal a particular number of times, for example, three times, before attempting an alternate technique. The rover 300 may include an accelerometer or other motion sensing device to assist in determining when the rover 300 contacts the unwanted animal. In some implementations, the rover 300 may use a retractable device to contact the unwanted animal. For example, the rover 300 may extend the retractable device as the rover 300 approaches the unwanted animal. The rover 300 may retrace the retractable device after detecting that the retractable device contacted the unwanted animal.

The rover 300 includes a speaker 375 and a microphone 380. The rover 300 may use the speaker 375 to play noise in an attempt to scare off unwanted animals. The rover 300 may position the speaker 375 to direct noise in a particular direction, such as towards the unwanted animal. In some implementations, the rover 300 may adjust the volume of noise outputted by the speaker 375 depending on the distance between the rover 300 and the unwanted animal. The speaker 375 may be configured to produce ultrasonic noise or noise audible to humans. The rover 300 may select either ultrasonic or audible noise depending on the rover 300 detecting any nearby humans. The rover 300 may use the microphone 380 to detect sounds. The rover 300 may analyze the detected sounds for animal noises. If a sound corresponds to a potential unwanted animal, then the rover 300 may move to the area of the sound. In some implementations, the rover 300 may detect an animal noise and store the noise as a sound of an unwanted animal if the rover determines that the noise originates from an unwanted animal. In some implementations, the rover 300 may receive data that includes noise patterns of unwanted animals and compare any received audio to the stored noise patterns.

The rover 300 includes a light source 385. The rover 300 may use the light source 385 to flash light at an unwanted animal. For example, the rover 300 may navigate to an unwanted animal and flash the light source 385 three times in an attempt to scare the unwanted animal. In some implementations, the rover 300 may use the light source 385 with the image sensor 345 to improve performance of the image sensor 345 in lowlight settings. The rover 300 may also use the light source 385 to improve navigation. In some implementations, the rover 300 includes an ambient light sensor to determine an amount of light to emit from the light source 385 in low light settings or to scare the unwanted animal.

FIG. 4 illustrates an example process 400 for identifying and removing an unwanted animal from a property. In general, the process 400 surveys a property and navigates a rover to a location of an unwanted animal. The process 400 activates devices that are designed to scare off the unwanted animal. The process 400 will be described as being performed by a robotic rover system, for example, robotic rovers 105, 205, or 300 as shown in FIG. 1-3, respectively.

The system scans a property (410). In some implementations, the system scans the property using an image sensor. In some implementations, the system receives image data from remote cameras positioned throughout the property. In some implementations, the system scans the property using an infrared sensor, a directional microphone, or other sensing devices.

The system identifies a moving object within the property (420). In some implementations, the system determines a path of the moving object. The path may indicate that the object moved from outside the property to inside the property. The path may indicate that the object moved from inside the house to outside the house. The system may determine a speed of the moving object and the size of the moving object.

The system determines that the moving object is an unwanted animal (430). The system may determine that the moving object is an unwanted animal based on one or more factors. In some implementations, the system determines that the moving object is an unwanted animal based on the path of the moving object. Moving objects with paths that originate in the house are likely to be people or pets. Moving objects with paths that cross into the property from a neighboring property are likely to be unwanted animals. In some implementations, the system determines that the moving object is an unwanted animal based on the size or speed of the moving object. For example, the system may not determine that objects similar in size to a human are unwanted animals. The system may determine that an object moving at three miles per hour may be an unwanted animal. In some implementations, the system may determine a moving object is an unwanted animal based on sounds emanating from the direction of the moving object.

In some implementations, the system may be unable to determine whether the moving object is likely an unwanted animal. In this instance, the system may traverse the property and approach the moving object to improve the data collected by the sensors such as the image sensor, microphone, and other sensors and increase the likelihood that the system is able to determine whether the object is an unwanted animal.

In some implementations, the object may not be moving. In this instance, the system may rely on infrared sensors to detect warm blooded animals that may not be distinguishable when analyzing data from an image sensor. In some implementations, the system may be able to distinguish a stationary object from the surroundings and determine that the stationary object is an unwanted animal based on image sensor data as well as other sensor data such as audio data. The system may also use data from the infrared sensors as another factor when determining whether a moving object is an unwanted animal.

The system navigates to a location of the unwanted animal (440). The system may access map data of the premises to determine the most efficient path to the location of the unwanted animal. For example, the system may avoid water and other obstacles. The system may use location sensors, such as GPS, for navigation to the location of the unwanted animal. For obstacles that the system is unware of, the system may detect those objects using sensors such as infrared, sonar, LiDAR, image, or other sensors. The system may navigate around those object and add them to the map data.

The system activates devices that are configured to encourage the unwanted animal to leave the property (450). In some implementations, the system approaching the unwanted animal will be enough to encourage the unwanted animal to leave he property. In this instance, the system will return to the dock without activating any devices at are configured to encourage the unwanted animal to leave the property. In instances where the unwanted animal does not leave the property as the system approaches, the system may bump into the unwanted animal, emit audible or ultrasonic noise, flash a light, and/or spray the unwanted animal with water. The system may continue to activate these devices until the system determines that the unwanted animal has left the property. The system returns to the docking station to recharge the system's battery and refill the water tank. The system returns to monitoring the property from the docking station.

FIG. 5 is a block diagram of components of a system 500 for identifying and removing an unwanted animal from a property. The system 500 includes a network 505, a monitoring system control unit 510, one or more user devices 540, 550, a monitoring application server 560, and a central alarm station server 570. In some examples, the network 505 facilitates communications between the monitoring system control unit 510, the one or more user devices 540, 550, the monitoring application server 560, and the central alarm station server 570.

The network 505 is configured to enable exchange of electronic communications between devices connected to the network 505. For example, the network 505 may be configured to enable exchange of electronic communications between the monitoring system control unit 510, the one or more user devices 540, 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitoring system control unit 510. In some examples, the controller 512 may include a processor or other control circuitry configured to execute instructions of a program that controls operation of an alarm system. In these examples, the controller 512 may be configured to receive input from sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring system control unit 510 to communicate over a local area network and/or the Internet. The network module 514 also may be a voiceband modem configured to enable the alarm panel to communicate over the telephone lines of Plain Old Telephone Systems (POTS).

The monitoring system that includes the monitoring system control unit 510 includes one or more sensors or detectors. For example, the monitoring system may include multiple sensors 520. The sensors 520 may include a contact sensor, a motion sensor, a glass break sensor, or any other type of sensor included in an alarm system or security system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The monitoring system control unit 510 communicates with the module 522 and the camera 530 to perform surveillance or monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the monitoring system control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building monitored by the monitoring system control unit 510. The camera 530 may be configured to capture single, static images of the area and also video images of the area in which multiple images of the area are captured at a relatively high frequency (e.g., thirty images per second). The camera 530 may be controlled based on commands received from the monitoring system control unit 510.

The camera 530 may be triggered by several different types of techniques. For instance, a Passive Infra Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the monitoring system control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the monitoring system control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the monitoring system control unit 510 and can control the environmental (e.g., temperature) settings based on commands received from the monitoring system control unit 510.

In some implementations, the thermostat 534 is a dynamically programmable thermostat and can be integrated with the monitoring system control unit 510. For example, the dynamically programmable thermostat 534 can include the monitoring system control unit 510, e.g., as an internal component to the dynamically programmable thermostat 534. In addition, the monitoring system control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more robotic rovers 580 and 582. The robotic rovers 580 and 582 may be any type of robots that are capable of moving and taking actions that assist in security monitoring. For example, the robotic rovers 580 and 582 may include drones that are capable of moving throughout a property based on automated control technology and/or user input control provided by a user. In this example, the rovers may be able to fly, roll, walk, or otherwise move about the property. The rovers may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic rovers 580 and 582 may be robotic rovers that are intended for other purposes and merely associated with the monitoring system 500 for use in appropriate circumstances. For instance, a robotic vacuum cleaner device may be associated with the monitoring system 500 as one of the robotic rovers 580 and 582 and may be controlled to take action responsive to monitoring system events.

In some examples, the robotic rovers 580 and 582 automatically navigate within a property. In these examples, the robotic rovers 580 and 582 include sensors and control processors that guide movement of the robotic rovers 580 and 582 within the property. For instance, the robotic rovers 580 and 582 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic rovers 580 and 582 may include control processors that process output from the various sensors and control the robotic rovers 580 and 582 to move along a path that reaches the desired destination and avoids obstacles. In this regard, the control processors detect fences, walls, trees or other obstacles in the property and guide movement of the robotic rovers 580 and 582 in a manner that avoids the obstacles.

In addition, the robotic rovers 580 and 582 may store data that describes attributes of the property. For instance, the robotic rovers 580 and 582 may store a map and/or a three-dimensional model of the property that can be used to enable the robotic rovers 580 and 582 to navigate the property. During initial configuration, the robotic rovers 580 and 582 may receive the data describing attributes of the property, determine a frame of reference to the data (e.g., a home, tree, fence, fountain, or reference location in the property), and navigate the property based on the frame of reference and the data describing attributes of the property. Further, initial configuration of the robotic rovers 580 and 582 also may include learning of one or more navigation patterns in which a user provides input to control the robotic rovers 580 and 582 to perform a specific navigation action (e.g., move to a back corner of the yard and spin around while capturing video and then return to a home charging base). In this regard, the robotic rovers 580 and 582 may learn and store the navigation patterns such that the robotic rovers 580 and 582 may automatically repeat the specific navigation actions upon a later request.

The robotic rovers 580 and 582 also may include a communication module that enables the robotic rovers 580 and 582 to communicate with the monitoring system control unit 510, each other, and/or other devices. The communication module may be a wireless communication module that allows the robotic rovers 580 and 582 to communicate wirelessly. For instance, the communication module may be a Wi-Fi module that enables the robotic rovers 580 and 582 to communicate over a local wireless network at the property. The communication module further may be a 900 MHz wireless communication module that enables the robotic rovers 580 and 582 to communicate directly with the monitoring system control unit 510. Other types of short-range wireless communication protocols, such as Bluetooth, Bluetooth LE, Zwave, Zigbee, etc., may be used to allow the robotic rovers 580 and 582 to communicate with other devices in the property.

The robotic rovers 580 and 582 further may include processor and storage capabilities. The robotic rovers 580 and 582 may include any suitable processing devices that enable the robotic rovers 580 and 582 to operate applications and perform the actions described throughout this disclosure. In addition, the robotic rovers 580 and 582 may include solid state electronic storage that enables the robotic rovers 580 and 582 to store a manual control map of the property and one or more machine learning models. Alternatively, or in addition, the robotic rovers 580 solid state electronic storage may include applications, configuration data, collected sensor data, collected video data, collected image data, and/or any other type of information available to the robotic rovers 580 and 582.

The robotic rovers 580 and 582 are associated with one or more docking stations 590 and 592. The docking stations 590 and 592 may be located at a predefined home base, one or more reference locations in the property, or both. The robotic rovers 580 and 582 may be configured to navigate to the docking stations 590 and 592 after completion of tasks needed to be performed for the monitoring system 500 and/or tasks determined by the rover. For instance, after completion of a task such as performing routine surveillance of a property, a robotic rover such as robotic rovers 580 or 582 may be configured to automatically navigate to an area of property that include one of the docking stations 590 and 592 and dock with the docking station 590 or 592. Docking with a docking station 590 or 592 may include establishing a removable coupling between a robotic rover 580 or 582 and a docking station 590 or 592. The removable coupling may include a physical connection using one or more mechanisms to removably couple to the robotic rover 580 or 582 to the docking station 590 or 592 such as a latching mechanism, a magnet, or the like. The docking stations 590 or 592 may be configured to charge the robotic rover 580 or 582 and fill its water tank while the robotic rover 580 or 582 is removably coupled to the docking station 590 or 592. In this regard, the robotic rovers 580 and 582 may automatically maintain a fully charged battery and full water tank in a state in which the robotic rovers 580 and 582 are ready for use by the monitoring system 500 or encourage an unwanted animal to leave the property as determined by the robotic rovers 580 and 582.

The docking stations 590 and 592 may facilitate contact based battery charging and/or wireless based battery charging. For contact based battery charging, the robotic rovers 580 and 582 may have readily accessible points of contact that the robotic rovers 580 and 582 are capable of positioning and mating with a corresponding contact on the docking station 590 or 592. For instance, a ground type robotic rover may have an electronic contact on a portion of its chassis that rests on and mates with an electronic pad of a docking station 590 or 592 when the ground type robotic rover lands on the docking station. The electronic contact on the robotic rover may include a cover that opens to expose the electronic contact when the robotic rover 580 or 582 is charging and closes to cover and insulate the electronic contact when the robotic rover 580 or 582 is in operation.

For docking stations that charge wirelessly, the robotic rovers 580 and 582 may charge through a wireless exchange of power. In these cases, the robotic rovers 580 and 582 need only locate themselves closely enough to the docking station that charges wirelessly for the wireless exchange of power to occur. In this regard, the positioning needed to park at a predefined home base or reference location in the property may be less precise than with a docking station that charges based on contact. Based on the robotic rovers 580 and 582 parking at a docking station that charges wirelessly, the docking station outputs a wireless signal that the robotic rovers 580 and 582 receive and convert to a power signal that charges a battery maintained on the robotic rovers 580 and 582.

In some implementations, each of the robotic rovers 580 and 582 has a corresponding and assigned docking station 590 and 592 such that the number of robotic rovers 580 and 582 equals the number of docking stations 590 and 592. In these implementations, the robotic rovers 580 and 582 always navigate to the specific docking station assigned to that robotic device. For instance, the robotic rover 580 may always use docking station 590 and the robotic rover 582 may always use docking station 592.

In some examples, the robotic rovers 580 and 582 may share docking stations. For instance, the robotic rovers 580 and 582 may use one or more community docking stations that are capable of docking multiple robotic rovers 580 and 582. The community docking station may be configured to charge multiple robotic rovers 580 and 582 in parallel. For example, one robotic rover 580 may be removably coupled to the docking station 590 or 592 and another robotic rover 582 may navigate around the same docking station and charge wirelessly. The community docking station may be configured to charge multiple robotic rovers 580 and 582 in serial such that the multiple robotic rovers 580 and 582 take turns charging and, when fully charged, return to a predefined home base or reference location in the property that is not associated with a charger. The number of community docking stations may be less than the number of robotic rovers 580 and 582.

Also, the docking stations 590 and 592 may not be assigned to specific robotic rovers 580 and 582 and may be capable of charging any of the robotic rovers 580 and 582. In this regard, the robotic rovers 580 and 582 may use any suitable, unoccupied docking station when not in use. For instance, when one of the robotic rovers 580 and 582 has completed an operation or is in need of battery charging, the monitoring system control unit 510 references a stored table of the occupancy status of each docking station and instructs the robotic rover to navigate to the nearest docking station that is unoccupied.

The docking stations 590 and 592 may further include processor and storage capabilities. The docking stations 590 and 592 may include any suitable processing devices that enable the docking stations 590 and 592 to operate applications and perform the actions described throughout this disclosure. In addition, the docking stations 590 and 592 may include solid state electronic storage that enables the docking stations 590 and 592 to store information related to one or more VLC devices.

In some implementations, each respective docking station 590 and 592 may include one or more visible light communication (VLC) devices. The VLC devices may include a light that outputs light beams in the visible spectrum. The light may include a fluorescent lamp, an LED lamp, or the like. The light beam can be detected using a robotic rover-mounted light detection unit. The robotic rover-mounted light detection unit can obtain location information from the detected light beams and adjust the rover's path towards a docking station based on the obtained location information. The robotic-rover-mounted light detection unit may include a light sensitive imaging sensor, one or more photodiodes capable of translating light pulses, or a combination thereof. In some implementations, an array of photodiodes may be used.

Alternatively, or in addition, some implementations may include robotic rovers 580 or 582 that include one or more robotic-device-mounted VLC devices. In such instances, the docking stations 590 and 592 may be configured with a docking-station-mounted light detection unit. The docking-station-mounted light detection unit may include a light sensitive imaging sensor, one or more photodiodes capable of translating light pulses, or a combination thereof. In some implementations, an array of photodiodes may be used. The docking station 590 or 592 can determine when a robotic rover 580 or 582 is on a path that approaches the docking station to dock. The docking station 590 or 592 may detect one or more light beams from the robotic-device-mounted VLC devices, translate the one or more light beams to electrical signals such as digital signals, and determine the relative location of the robotic rover 580 or 582 that is on a path approaching the docking station to dock. The docking station 590 or 592 may generate a navigation path adjustment message and transmit the navigation path adjustment message to a robotic rover that is on a path approaching the docking station to dock. The robotic rover 580 or 582 can update the robotic device's navigation path towards the docking station 590 or 592 based on the received navigation path adjustment message.

The sensors 520, the module 522, the camera 530, the thermostat 534, and the robotic rovers 580 and 582 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the robotic rovers 580 and 582 to the controller 512. The sensors 520, the module 522, the camera 530, the thermostat 534, and the robotic rovers 580 and 582 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the robotic rovers 580 and 582 and the controller 512 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category (CAT5) or Category 5 (CAT6) wired Ethernet network. The local network may be a mesh network constructed based on the devices connected to the mesh network.

The monitoring application server 560 is an electronic device configured to provide monitoring services by exchanging electronic communications with the monitoring system control unit 510, the one or more user devices 540, 550, and the central alarm station server 570 over the network 505. For example, the monitoring application server 560 may be configured to monitor events (e.g., alarm events) generated by the monitoring system control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540, 550.

In some examples, the monitoring application server 560 may route alarm data received from the network module 514 or the one or more user devices 540, 550 to the central alarm station server 570. For example, the monitoring application server 560 may transmit the alarm data to the central alarm station server 570 over the network 505.

The central alarm station server 570 is an electronic device configured to provide alarm monitoring service by exchanging communications with the monitoring system control unit 510, the one or more robotic rovers 580 and 582, the one or more mobile devices 540, 550, and the monitoring application server 560 over the network 505. For example, the central alarm station server 570 may be configured to monitor alarm events generated by the monitoring system control unit 510. In this example, the central alarm station server 570 may exchange communications with the network module 514 included in the monitoring system control unit 510 to receive information regarding alarm events detected by the monitoring system control unit 510. The central alarm station server 570 also may receive information regarding alarm events from the one or more mobile devices 540, 550, one or more robotic rovers 580 and 582, and/or the monitoring application server 560.

The central alarm station server 570 is connected to multiple terminals 572 and 574. The terminals 572 and 574 may be used by operators to process alarm events. For example, the central alarm station server 570 may route alarm data to the terminals 572 and 574 to enable an operator to process the alarm data. The terminals 572 and 574 may include general-purpose computers (e.g., desktop personal computers, workstations, or laptop computers) that are configured to receive alarm data from a server in the central alarm station server 570 and render a display of information based on the alarm data. For instance, the controller 512 may control the network module 514 to transmit, to the central alarm station server 570, alarm data indicating that a sensor 520 detected a door opening when the monitoring system was armed. The central alarm station server 570 may receive the alarm data and route the alarm data to the terminal 572 for processing by an operator associated with the terminal 572. The terminal 572 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540, 550 are devices that host and display user interfaces. For instance, the user device 540 is a mobile device that hosts one or more native applications (e.g., the native surveillance application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a native surveillance application 542. The native surveillance application 542 refers to a software/firmware program running on the corresponding mobile device that enables the user interface and features described throughout. The user device 540 may load or install the native surveillance application 542 based on data received over a network or data received from local media. The native surveillance application 542 runs on mobile devices platforms, such as iPhone, iPod touch, Blackberry, Google Android, Windows Mobile, etc. The native surveillance application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the monitoring system control unit 510 over the network 505. The user device 550 may be configured to display a surveillance monitoring user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540, 550 communicate with and receive monitoring system data from the monitoring system control unit 510 using the communication link 538. For instance, the one or more user devices 540, 550 may communicate with the monitoring system control unit 510 using various local wireless protocols such as wifi, Bluetooth, zwave, zigbee, HomePlug (ethernet over powerline), or wired protocols such as Ethernet and USB, to connect the one or more user devices 540, 550 to local security and automation equipment. The one or more user devices 540, 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540, 550 are shown as communicating with the monitoring system control unit 510, the one or more user devices 540, 550 may communicate directly with the sensors and other devices controlled by the monitoring system control unit 510. In some implementations, the one or more user devices 540, 550 replace the monitoring system control unit 510 and perform the functions of the monitoring system control unit 510 for local monitoring and long range/offsite communication.

In other implementations, the one or more user devices 540, 550 receive monitoring system data captured by the monitoring system control unit 510 through the network 505. The one or more user devices 540, 550 may receive the data from the monitoring system control unit 510 through the network 505 or the monitoring application server 560 may relay data received from the monitoring system control unit 510 to the one or more user devices 540, 550 through the network 505. In this regard, the monitoring application server 560 may facilitate communication between the one or more user devices 540, 550 and the monitoring system.

In some implementations, the one or more user devices 540, 550 may be configured to switch whether the one or more user devices 540, 550 communicate with the monitoring system control unit 510 directly (e.g., through link 538) or through the monitoring application server 560 (e.g., through network 505) based on a location of the one or more user devices 540, 550. For instance, when the one or more user devices 540, 550 are located close to the monitoring system control unit 510 and in range to communicate directly with the monitoring system control unit 510, the one or more user devices 540, 550 use direct communication. When the one or more user devices 540, 550 are located far from the monitoring system control unit 510 and not in range to communicate directly with the monitoring system control unit 210, the one or more user devices 540, 550 use communication through the monitoring application server 560.

Although the one or more user devices 540, 550 are shown as being connected to the network 505, in some implementations, the one or more user devices 540, 550 are not connected to the network 505. In these implementations, the one or more user devices 540, 550 communicate directly with one or more of the monitoring system components and no network (e.g., Internet) connection or reliance on remote servers is needed.

In some implementations, the one or more user devices 540, 550 are used in conjunction with only local sensors and/or local devices in a house. In these implementations, the system 500 only includes the one or more user devices 540, 550, the sensors 520, the module 522, the camera 530, and the robotic rovers 580 and 582. The one or more user devices 540, 550 receive data directly from the sensors 520, the module 522, the camera 530, and the robotic rovers 580 and 582 and sends data directly to the sensors 520, the module 522, the camera 530, and the robotic rovers 580 and 582.

In other implementations, the system 500 further includes network 505 and the sensors 520, the module 522, the camera 530, the thermostat 534, and the robotic rovers 580 and 582 are configured to communicate sensor and image data to the one or more user devices 540, 550 over network 505 (e.g., the Internet, cellular network, etc.). In yet another implementation, the sensors 520, the module 522, the camera 530, the thermostat 534, and the robotic rovers 580 and 582 (or a component, such as a bridge/router) are intelligent enough to change the communication pathway from a direct local pathway when the one or more user devices 540, 550 are in close physical proximity to the sensors 520, the module 522, the camera 530, the thermostat 534, and the robotic rovers 580 and 582 to a pathway over network 505 when the one or more user devices 540, 550 are farther from the sensors 520, the module 522, the camera 530, the thermostat 534, and the robotic rovers 580 and 582. In some examples, the system leverages GPS information from the one or more user devices 540, 550 to determine whether the one or more user devices 540, 550 are close enough to the sensors 520, the module 522, the camera 530, the thermostat 534, and the robotic rovers 580 and 582 to use the direct local pathway or whether the one or more user devices 540, 550 are far enough from the sensors 520, the module 522, the camera 530, the thermostat 534, and the robotic rovers 580 and 582 that the pathway over network 505 is required. In other examples, the system leverages status communications (e.g., pinging) between the one or more user devices 540, 550 and the sensors 520, the module 522, the camera 530, the thermostat 534, and the robotic rovers 580 and 582 to determine whether communication using the direct local pathway is possible. If communication using the direct local pathway is possible, the one or more user devices 540, 550 communicate with the sensors 520, the module 522, the camera 530, the thermostat 534, and the robotic rovers 580 and 582 using the direct local pathway. If communication using the direct local pathway is not possible, the one or more user devices 540, 550 communicate with the sensors 520, the module 522, the camera 530, the thermostat 534, and the robotic rovers 580 and 582 using the pathway over network 505.

In some implementations, the system 500 provides end users with access to images captured by the camera 530 to aid in decision making. For example, the system 500 may provide an image, video, or the like of a room in the property that has a light left on. The light left on may be detected based on the readings of one or more light sensors, one or more motion sensors, other similar sensors, or a combination thereof, that are located throughout a property. The system 500 may transmit the images captured by the camera 530 over a wireless WAN network to the user devices 540, 550. Because transmission over a wireless WAN network may be relatively expensive, the system 200 uses several techniques to reduce costs while providing access to significant levels of useful visual information. In response to receipt of data that indicates one or more lights were left on in a property, a user of the user device 540, 550 may input an instruction for one or more robotic rover to turn off the light. One or more robotic rovers 580 and 582 may (i) receive the instruction directly from the user device 540, 550 or indirectly after the instruction is received by, and forwarded from, a monitoring system control unit 510, (ii) access a stored map that provides the location of the manual control associated with the light, (iii) navigate to the manual control associated with the light, (iv) deploy a mechanical arm, and (v) use the mechanical arm to manipulate the manual control associated with the light to turn off the light.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

Further, in some implementations, the system 500 intelligently leverages the robotic rovers 580 and 582 to aid in security monitoring, property automation, and property management. For example, the robotic rovers 580 and 582 may aid in investigating alarm events detected at the property by the monitoring system control unit 510. In this example, the monitoring system control unit 510 may detect an event (e.g., a light left on, a burner left on, a faucet left on, a garage door left open, or the like) and, based on the detected event, control the robotic rovers 580 and 582 to attempt to capture still images, video, or the like that can be provided to a user device 540, 550. Each of the robotic rovers 580 and 582 may execute a predefined navigation pattern within the property or the robotic rovers 580 and 582 based on a stored map of the property. The map may have been previously generated by using one or more robotic rovers 580 and 582 to execute a coordinated scan of the property in which the robotic rovers 580 and 582 exchange location information and navigate to areas that have not been explored by one of the other devices.

In some examples, the robotic rovers 580 and 582 may be assigned to different areas of the property where the robotic rovers 580 and 582 can move in an unobstructed manner. In these examples, the robotic rovers 580 and 582 may be assigned to different levels in a property (e.g., an upstairs robotic rover and a downstairs robotic device) and even different rooms or sections that are potentially blocked by doors. The monitoring system control unit 510 coordinate tracking movement based on the assigned areas. For instance, the monitoring system control unit 510 determines areas in a property where an event has been detected and only controls the robotic rovers assigned to the determined areas to operate.

In addition, the robotic rovers 580 and 582 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 510 may open a door to enable an exterior robotic rover to leave and return to the property. For instance, an exterior device may have a base or reference location in a garage of the property and the monitoring system control unit 510 may automatically open a garage door to allow the exterior device to leave the garage and explore the exterior of the property.

In some implementations, the monitoring system control unit 510 may monitor operational status of the robotic rovers 580 and 582 and coordinate further operation based on the operational status. In these implementations, the monitoring system control unit 510 may detect that a particular robotic rover is no longer operational and control one or more other robotic devices to perform operations originally assigned to the non-operational robotic device.

In some implementations, the monitoring system control unit 510 may determine battery power available for each of the robotic rovers 580 and 582 and coordinate operation of the robotic rovers 580 and 582 based on available battery power. In these implementations, the robotic rovers 580 and 582 may report battery power remaining to the monitoring system control unit 510 and the monitoring system control unit 510 may determine a subset of the robotic rovers 580 and 582 to deploy based on the battery power information. For instance, the monitoring system control unit 510 may select to initially deploy the robotic rover with the most available battery power to allow the other robotic rovers to charge while the selected device assists with monitoring. Once the battery power for the selected device falls below a threshold, the monitoring system control unit 510 may return the selected device to a docking station and select the robotic rover with the presently highest available battery power to resume the monitoring options being performed. The monitoring system control unit 510 may cycle through all of the robotic rovers 580 and 582 in an intelligent manner that best leverages the battery power available. If the battery power of a device becomes too low to effectively operate as a navigating device, the monitoring system control unit 510 may control the robotic rover to remain stationary and act as a stationary camera or other sensor to still assist with monitoring, although the added benefit of navigation no longer exists.

In some implementations, the system 500 allows central station operators, first responders, and/or users of the property to interact with and control the robotic rovers 580 and 582. In these implementations, a central station operator, first responder, or user of the property may provide input to control the robotic rovers 580 and 582 in a manner that best assists with monitoring and investigation of detected events. For instance, the central station operator, first responder, or user of the property may remotely control navigation of the robotic rovers 580 and 582. The central station operator, first responder, or user of the property also may provide general commands related to actions the robotic rovers 580 and 582 are designed to take. Alternatively, or in addition, a central station operator, first responder, or user of the property may take control of the robotic rovers 580 and 582. For example, a user may use a user device 540, 550 to direct navigation of the robotic rovers 580 and 582, remotely control the robotic device's 580 and 582 mechanical arm, or the like.

Such control may be beneficial in instances where the robotic rovers 580 and 582 encounter a problem in manipulating a manual control.

In some examples, the robotic rovers 580 and 582 may periodically perform test sequences to ensure the robotic rovers 580 and 582 will operate correctly if needed. In these examples, the robotic rovers 580 and 582 may periodically navigate predefined navigation patterns used to investigate the property and/or may navigate around the property in a scanning sequence. The robotic rovers 580 and 582 may determine whether the test sequences perform correctly or whether an error occurs that prevents full investigation of the property. To the extent an error occurs, the robotic rovers 580 and 582 report the error and enable a user of the property or a technician to correct the error prior to a time when the robotic rovers 580 and 582 would be needed for safety monitoring. For example, the monitoring system control unit 510 may periodically instruct robotic rovers 580 and 582 to navigate to a particular manual control and manipulate the manual control.

The monitoring system control unit 510 also may arrange the test sequences to occur during periods of time that are convenient for users of the property. For example, the monitoring system control unit 510 may assess sensor data at the property and determine a time period in which the property is unoccupied and unlikely to be occupied until the test sequences complete. In this example, the monitoring system control unit 510 waits until the preferred time period to initiate test sequences for one or more of the robotic rovers 580 and 582.

In some implementations, the robotic rovers 580 and 582 may operate as mobile sensors that move throughout the property. In these implementations, the robotic rovers 580 and 582 may have temperature sensors that can be used as inputs to a thermostat at the property. In this regard, the robotic rovers 580 and 582 may navigate throughout the property and take temperature measurements at various locations in the property. With the temperatures at various locations, the system 500 may identify hot and/or cold spots in the property and adjust thermostat operation accordingly. For instance, the robotic rovers 580 and 582 may be deployed to take temperature measurements in areas of the property where people are located and the thermostat may be adjusted to improve the temperature in the location where people are actually located in the property.

In some examples, the robotic rovers 580 and 582 may have humidity and air flow sensors in addition to temperature sensors. In these examples, the robotic rovers 580 and 582 may periodically navigate throughout the property and take temperature, humidity, and air flow measurements at various locations throughout the property. The system 500 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

What is claimed is:

1. A drone that is configured to monitor a property, the drone comprising:
   a sensor that is configured to generate sensor data;
   a motor that is configured to navigate the drone;
   one or more processors configured to:
   analyze the sensor data;
   determine, using a result of an analysis of the sensor data, that an unwanted animal is located at the property;
   in response to determining that the unwanted animal is located at the property, determine a location that is more likely than another location to cause the unwanted animal to leave the property, wherein the location comprises at least one of a location:
   for a most efficient path;
   that avoids obstacles; or
   that is away from people or pets;
   generate, using data for the location that is more likely than another location to cause the unwanted animal to leave the property, an instruction to navigate the drone towards the unwanted animal;
   provide, to the motor, the instruction to cause the motor to navigate the drone towards the unwanted animal in response to the instruction to navigate the drone towards the unwanted animal; and
   generate an instruction to activate a device that is configured to encourage the unwanted animal to leave the property.

2. The drone of claim 1, wherein:
   the sensor comprises a camera,
   the sensor data comprises image data, and
   the one or more processors are configured to:
   analyze the sensor data by analyzing the image data; and
   determine that the unwanted animal is located at the property by:
   using the analysis of the image data, identifying an object that is moving and determining that a shape of the object is non-human shaped; and
   in response to determining that the object is moving and determining that the shape of the object is non-human shaped, determining that the object is an unwanted animal.

3. The drone of claim 1, comprising:
   a receiver that is configured to receive a signal,
   wherein the one or more processors are configured to:
   analyze the signal;
   using the analysis of the signal, determine that a transmitter of the signal corresponds to a known transmitter; and
   in response to determining that the transmitter of the signal corresponds to a known transmitter, determine that a known animal is located at the property.

4. The drone of claim 3, wherein the transmitter is included in a pet collar and the known animal is a pet.

5. The drone of claim 1, comprising:
   a water tank that is configured to store water,
   wherein the device that is configured to activate in response to the instruction to activate the device to encourage the unwanted animal to leave the property comprises a water nozzle that is configured to spray water from the water tank, and
   wherein the one or more processors are configured to:
   generate an instruction to activate the device that is configured to encourage the unwanted animal to leave the property by generating an instruction to spray water from the water nozzle towards the unwanted animal.

6. The drone of claim 1, wherein:
the device that is configured to encourage the unwanted animal to leave the property comprises a speaker; and
the one or more processors are configured to:
  generate an instruction to activate the device that is configured to encourage the unwanted animal to leave the property by generating an instruction to provide audio data to the speaker.

7. The drone of claim 1, wherein the one or more processors are configured to generate an instruction to activate the device that is configured to encourage the unwanted animal to leave the property by generating an instruction for the drone to physically contact the unwanted animal.

8. The drone of claim 1, wherein:
the sensor comprises a microphone,
the sensor data comprises audio data, and
the one or more processors are configured to:
  analyze the sensor data by comparing the audio data to stored audio data that includes sounds of various unwanted animals; and
  determine that the unwanted animal is located at the property by:
    in response to comparing the audio data to the stored audio data that includes sounds of various unwanted animals, determine that the audio data corresponds to an unwanted animal.

9. The drone of claim 1, wherein the one or more processors are configured to:
using the analysis of the sensor data, determine that the unwanted animal is outside of the property; and
in response to determining that the unwanted animal is outside of the property, generate an instruction to navigate the drone to a dock.

10. The drone of claim 1, wherein the one or more processors are configured to:
using the analysis of the sensor data, determine a location of an object located at the property;
compare the location of the object to locations of known objects that are at the property and that are not unwanted animals;
in response to comparing the location of the object to the locations of known objects that are at the property and that are not unwanted animals, determine that the location of the object does not correspond to one of the locations of known objects that are at the property and that are not unwanted animals; and
determine that the unwanted animal is located at the property in response to determining that the location of the object does not correspond to one of the locations of known objects that are at the property and that are not unwanted animals.

11. A computer-implemented method, comprising:
receiving, from a sensor that is included in a drone that is configured to monitor a property, sensor data;
analyzing, by the drone, the sensor data;
determining, by the drone using a result of an analysis of the sensor data, that an unwanted animal is located at the property;
in response to determining that the unwanted animal is located at the property, determining by the drone, a location that is more likely than another location to cause the unwanted animal to leave the property, wherein the location comprises at least one of a location:
  for a most efficient path;
  that avoids obstacles; or
  that is away from people or pets;
navigating, by the drone and using data for the location that is more likely than another location to cause the unwanted animal to leave the property, towards the unwanted animal; and
activating, by the drone, a device that is configured to encourage the unwanted animal to leave the property.

12. The method of claim 11, wherein:
receiving the sensor data comprises receiving, by a camera that is included in the drone, image data,
analyzing the sensor data comprises analyzing the image data, and
determining that the unwanted animal is located at the property comprises:
  using the analysis of the image data, identifying an object that is moving and determining that a shape of the object is non-human shaped; and
  in response to determining that the object is moving and determining that the shape of the object is non-human shaped, determining that the object is the unwanted animal.

13. The method of claim 11, comprising:
receiving, by a receiver that is included in the drone, a signal;
analyzing the signal;
using the analysis of the signal, determining that a transmitter of the signal corresponds to a known transmitter; and
in response to analyzing the sensor data and determining that the transmitter of the signal corresponds to a known transmitter, determining that a known animal is located at the property.

14. The method of claim 13, wherein the transmitter is included in a pet collar and the known animal is a pet.

15. The method of claim 11, wherein:
activating the device that is configured to encourage the unwanted animal to leave the property comprises:
  spraying, from a water nozzle that is included in the drone, water towards the unwanted animal.

16. The method of claim 11, wherein:
activating the device that is configured to encourage the unwanted animal to leave the property comprises:
  providing, for output to a speaker included in the drone, audio data.

17. The method of claim 11, comprising:
activating the device that is configured to encourage the unwanted animal to leave the property comprises:
  contacting, by the drone, the unwanted animal with a retractable device or a bumper.

18. The method of claim 11, comprising:
receiving the sensor data comprises receiving, by a microphone that is included in the drone, audio data;
analyzing the sensor data comprises comparing the audio data to stored audio data that includes sounds of various unwanted animals; and
determining that the unwanted animal is located at the property comprises:
  in response to comparing the audio data to the stored audio data that includes sounds of various unwanted animals, determining that the audio data corresponds to the unwanted animal.

19. The method of claim 11, comprising:
using the analysis of the sensor data, determining that the unwanted animal is outside of the property; and in response to determining that the unwanted animal is outside of the property, navigating the drone to a dock.

20. The method of claim 11, comprising:
using the analysis of the sensor data, determining a location of an object located at the property;
comparing the location of the object to locations of known objects that are at the property and that are not unwanted animals; and
in response to comparing the location of the object to the locations of known objects that are at the property and that are not unwanted animals, determining that the location of the object does not correspond to one of the locations of known objects that are at the property and that are not unwanted animals,
wherein determining that the unwanted animal is located at the property is in response to determining that the location of the object does not correspond to one of the locations of known objects that are at the property and that are not unwanted animals.

21. A drone that is configured to monitor a property, the drone comprising:
a sensor that is configured to generate sensor data;
a motor that is configured to navigate the drone;
one or more processors configured to:
analyze the sensor data;
determine, using a result of an analysis of the sensor data, that an unwanted animal is located at the property;
in response to determining that the unwanted animal is located at the property, determine a location that is more likely than another location to cause the unwanted animal to leave the property, wherein the location comprises at least one of a location that causes the drone to approach the unwanted animal in a manner that drives the unwanted animal away from the center of the property;
generate, using data for location that is more likely than another location to cause the unwanted animal to leave the property, an instruction to navigate the drone towards the unwanted animal;
provide, to the motor, the instruction to cause the motor to navigate the drone towards the unwanted animal in response to the instruction to navigate the drone towards the unwanted animal; and
generate an instruction to activate a device that is configured to encourage the unwanted animal to leave the property.

\* \* \* \* \*